United States Patent
Bandyopadhyay et al.

(10) Patent No.: US 11,774,929 B2
(45) Date of Patent: Oct. 3, 2023

(54) FIELD CONTROLLER FOR A BUILDING MANAGEMENT SYSTEM

(71) Applicant: Johnson Controls Tyco IP Holdings LLP, Milwaukee, WI (US)

(72) Inventors: Boudhayan Bandyopadhyay, Kolkata (IN); Saikat Patra, Pune (IN); Khalil B. Mujawar, Thane (IN); Neeraj S. Kale, Pune (IN)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 47 days.

(21) Appl. No.: 17/395,762

(22) Filed: Aug. 6, 2021

(65) Prior Publication Data

US 2022/0043407 A1    Feb. 10, 2022

(30) Foreign Application Priority Data

Aug. 6, 2020 (IN) .............................. 202021033636

(51) Int. Cl.
*G05B 15/02* (2006.01)
*G06F 8/65* (2018.01)

(52) U.S. Cl.
CPC .............. *G05B 15/02* (2013.01); *G06F 8/65* (2013.01)

(58) Field of Classification Search
CPC ..................................................... G05B 15/02
See application file for complete search history.

(56) References Cited

U.S. PATENT DOCUMENTS

| | | | | |
|---|---|---|---|---|
| 2011/0071685 A1* | 3/2011 | Huneycutt | ............. | G05B 15/02 700/275 |
| 2011/0231157 A1* | 9/2011 | Alley | .................. | H03M 1/1225 702/187 |
| 2013/0304260 A1* | 11/2013 | Ramachandran | .. | G05B 19/0423 700/276 |
| 2015/0035875 A1* | 2/2015 | Jeon | ..................... | G09G 3/3648 345/691 |
| 2017/0033777 A1* | 2/2017 | Kim | ....................... | H03K 5/082 |
| 2021/0036509 A1* | 2/2021 | Chassaigne | ............ | H02H 7/268 |
| 2023/0026761 A1* | 1/2023 | Gianelli | ............... | G01S 13/931 |

FOREIGN PATENT DOCUMENTS

| | | | | | |
|---|---|---|---|---|---|
| CN | 109709373 | B | * | 8/2021 | |
| CN | 114937975 | A | * | 8/2022 | |
| EP | 3594133 | B1 | * | 12/2020 | ............... B03C 3/06 |
| EP | 2877242 | B1 | * | 9/2022 | ......... A61B 17/0482 |
| GB | 2545911 | A | * | 7/2017 | ............. G01N 27/06 |

* cited by examiner

*Primary Examiner* — Philip Wang
(74) *Attorney, Agent, or Firm* — Foley & Lardner LLP

(57) ABSTRACT

A controller for building equipment in a building management system, the controller including a processing circuit configured to receive a field signal from the building equipment on an input port of the controller, determine a type of the field signal, and update a control logic comprising instructions for reading the field signal by tagging within the control logic the input port with the determined type of the field signal.

20 Claims, 8 Drawing Sheets

FIELD CONTROLLER FOR A BUILDING MANAGEMENT SYSTEM

CROSS REFERENCE TO RELATED APPLICATIONS

This application claims the benefit of and priority to Indian Patent Application No. 202021033636, filed Aug. 6, 2020, the disclosure of which is hereby incorporated by reference in its entirety.

BACKGROUND

The present disclosure relates generally to building management systems. The present disclosure relates more particularly to a field controller that automatically determines the type of filed signal and updates control logic based on the type of field signal.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® building controllers or other devices sold by Johnson Controls, Inc., as well as building devices and components from other sources.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., LON, BACnet, etc.). The computer systems may also provide one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with the BMS, its subsystems, and devices.

Multiple field devices may be connected to the input ports of a field controller. The field devices transmit field signals containing sensed data. The sensed data is represented either by a current or voltage of the field signal and therefore, each field signal may be determined as either a current-type field signal or a voltage-type field signal. The field controller is provided with control logic that defines the type of field signal for each of the input ports. The field controller is enabled to read the sensed data by analyzing the field signal according to its type as stored in the control logic. Over a period of time, one of the field devices may be replaced/reconfigured due to performance issues, and the controller logic may no longer apply to the new field device. It is therefore essential to keep the control logic up to date by re-determining the type of field signal for the input port to which the replaced/reconfigured field device is connected.

Conventionally, a technician is required to manually update the control logic by performing any necessary changes in a controller application file (CAF) of the field controller. The process of manually updating the control logic is often time consuming and tedious due to the number of field devices and expansion modules that are connected to the field controller. Therefore, redefining the type of field signals correctly and then evaluating the changes/updates made in the control logic can be a challenge.

Therefore, there is a need for a field controller that automatically determines the type of field signal received at the one or more input ports, and updates the control logic accordingly.

SUMMARY

It is an object of the present disclosure to provide a field controller for a building management system. Another object is to provide a field controller that automatically determines the type of field signals provided by the field devices. Another object is to provide a field controller that automatically updates the control logic based on the determined field type of the field signals. Another object is to provide a field controller that requires less time for commissioning and troubleshooting. Other objects and advantages of the present disclosure will be more apparent from the following description, which is not intended to limit the scope of the patent.

One implementation of the present disclosure is a controller for building equipment in a building management system, the controller including a processing circuit configured to receive a field signal from the building equipment on an input port of the controller, determine a type of the field signal, and update a control logic comprising instructions for reading the field signal by tagging within the control logic the input port with the determined type of the field signal.

Another implementation of the present disclosure is a method for updating a control logic for a controller in a building management system, the method comprising the steps of receiving, through an input port of the controller, a field signal from a piece of building equipment, determining, by the controller, a type of the field signal, and updating, by the controller, the control logic by tagging the input port with the determined type of the field signal.

Another implementation of the present disclosure is a system for updating the control logic of a controller comprising a signal processing unit configured to receive a field signal from an input port of the controller and generate a first and second output based on the field signal, and a processing circuit communicably coupled to the signal processing circuit configured to determine a type of the field signal by comparing the first output voltage and the second output voltage and update a control logic comprising instructions for reading sensed data from the field signal by tagging the input port of the controller with the determined type of the field signal.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Building and Building Management System

Figure 1:
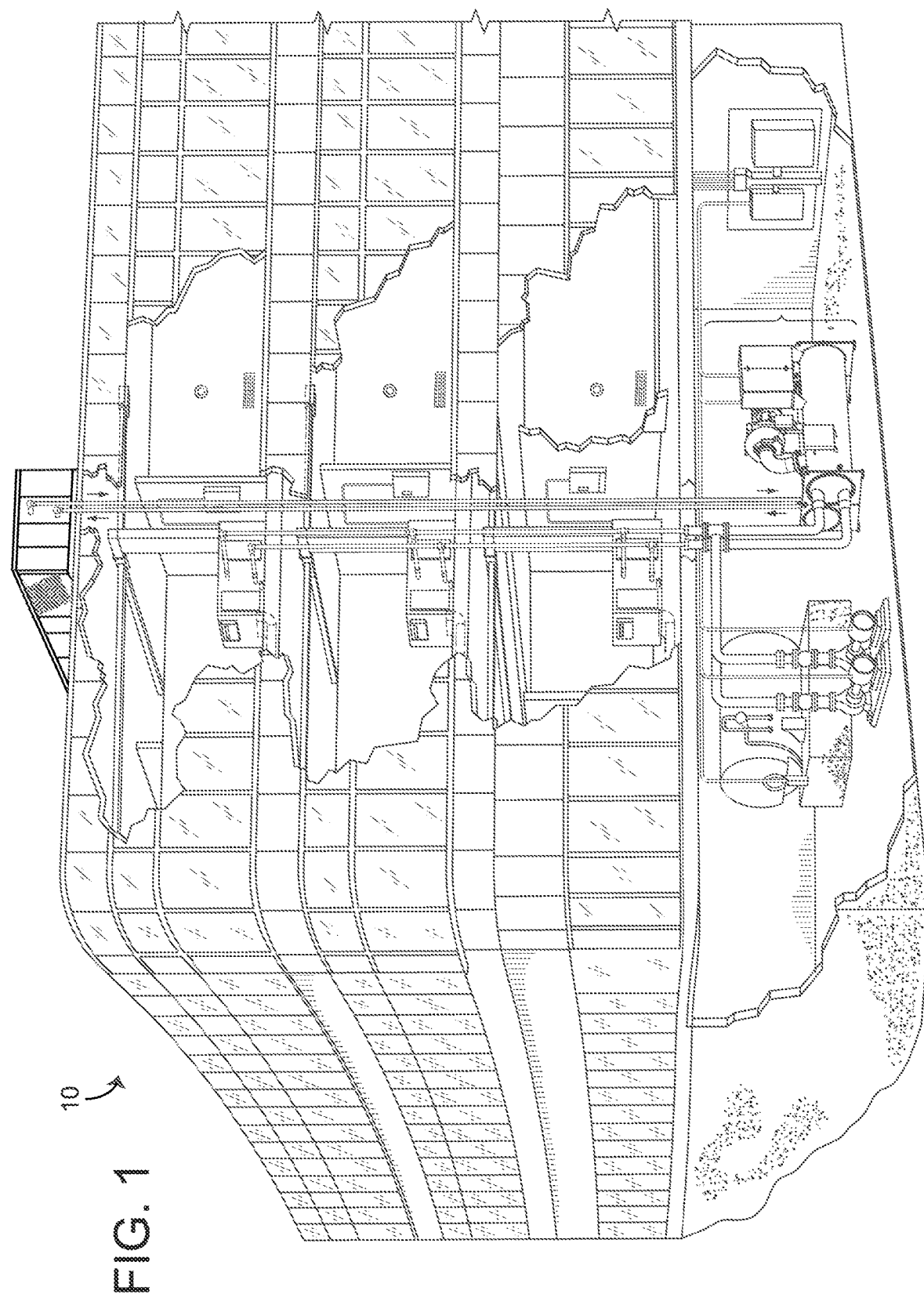
FIG. 1 is a drawing of a building equipped with a building management system (BMS), according to some embodiments.

Referring now to FIG. 1, a perspective view of a building 10 is shown, according to an exemplary embodiment. A BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices can exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that can be used to control, automate, or otherwise contribute to an environment, state, or condition of building 10. The terms "BMS devices," "BMS device" and "building equipment" are used interchangeably throughout this disclosure.

Figure 2:
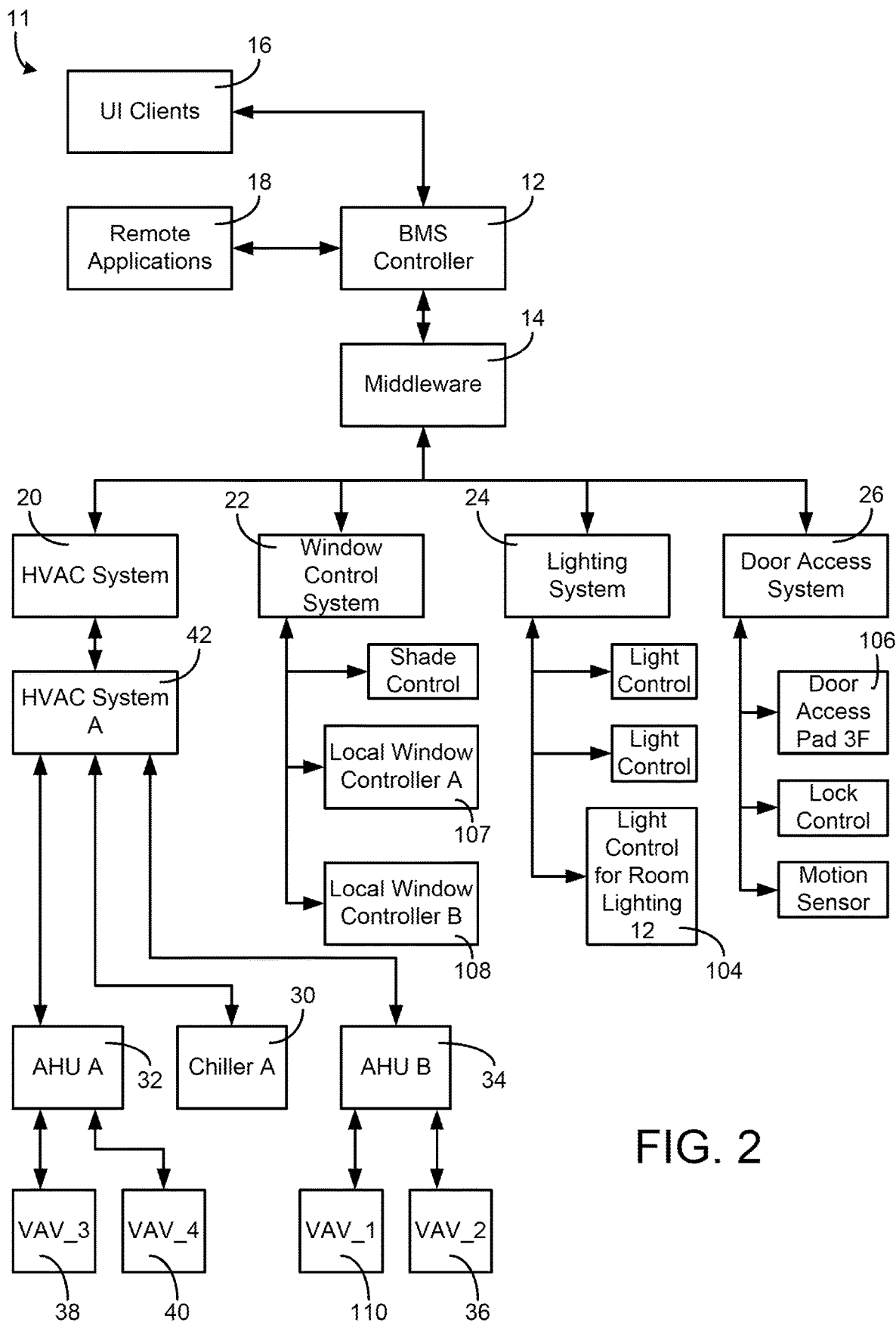
FIG. 2 is a block diagram of a BMS that serves the building of FIG. 1, according to some embodiments.

Referring now to FIG. 2, a block diagram of a BMS 11 for building 10 is shown, according to an exemplary embodiment. BMS 11 is shown to include a plurality of BMS subsystems 20-26. Each BMS subsystem 20-26 is connected to a plurality of BMS devices and makes data points for varying connected devices available to upstream BMS controller 12. Additionally, BMS subsystems 20-26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include a HVAC system 20. HVAC system 20 may control HVAC operations building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and on to middleware 14 and BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20-26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may integrated in some embodiments. For example, middleware 14 may be a part of BMS controller 12.

Still referring to FIG. 2, window control system 22 may receive shade control information from one or more shade controls, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS.

Lighting system 24 may receive lighting related information from a plurality of downstream light controls (e.g., from room lighting 104). Door access system 26 may receive lock control, motion, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20-26 may be connected to BMS controller 12 via middleware 14 and may be configured to provide BMS controller 12 with BMS inputs from various BMS subsystems 20-26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
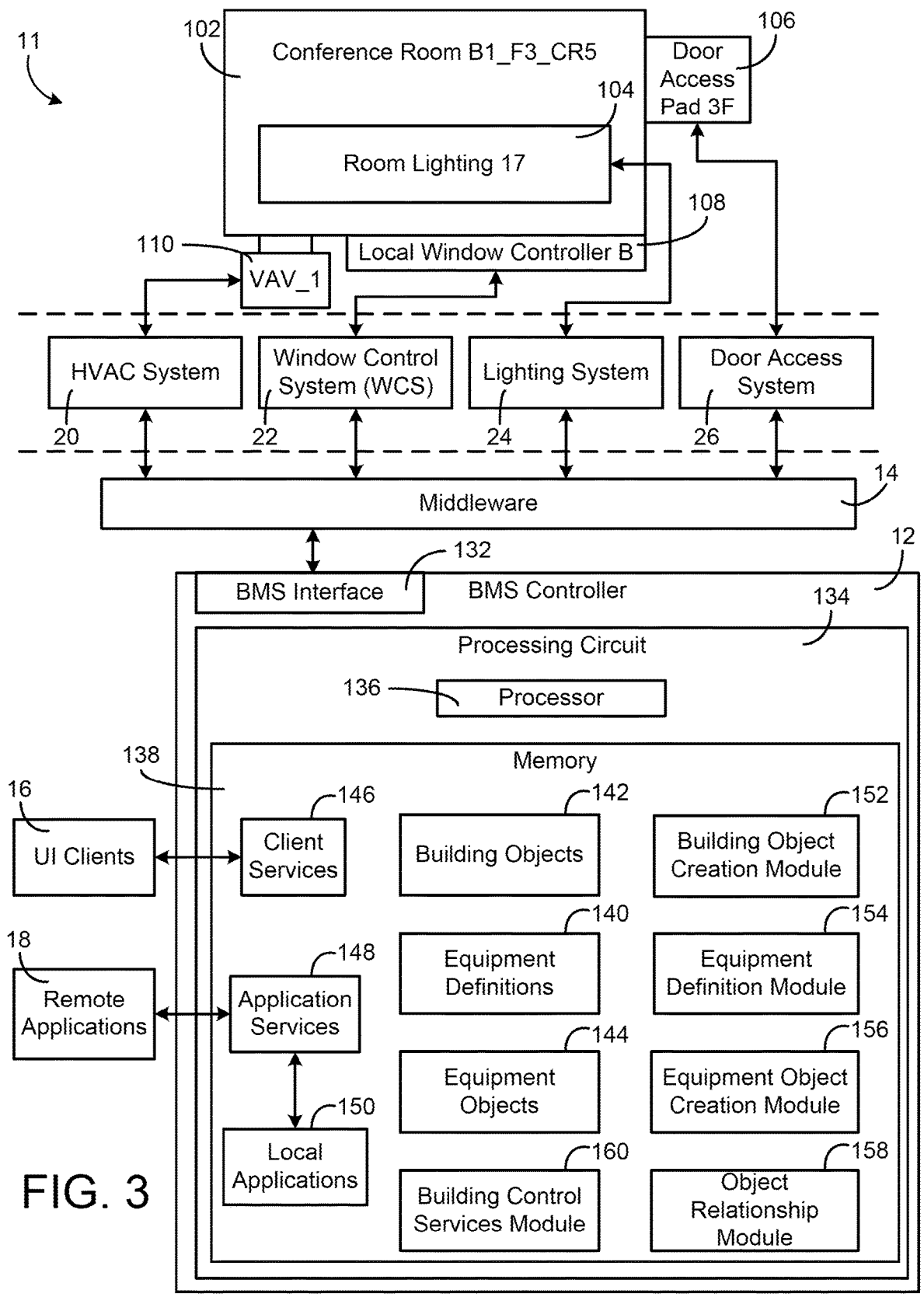
FIG. 3 is a block diagram of a BMS controller which can be used in the BMS of FIG. 2, according to some embodiments.

Referring now to FIG. 3, a block diagram illustrating a portion of BMS 11 in greater detail is shown, according to an exemplary embodiment. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20-26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system (WCS) 22. Room lighting 104 may include circuitry that affects the lighting in response to control signals received from a field controller that is part of lighting system 24. Access pad 106 may include circuitry that affects door access (e.g., locking or unlocking the door) in response to control signals received from a field controller that is part of door access system 26.

Still referring to FIG. 3, BMS controller 12 is shown to include a BMS interface 132 in communication with middleware 14. In some embodiments, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. BMS interface 132 can include an Ethernet card and port for sending and receiving data via an Ethernet-based communications network. In another example, BMS interface 132 includes a Wi-Fi transceiver for communicating via a wireless communications network. BMS interface 132 may be configured to communicate via local area networks or wide area networks (e.g., the Internet, a building WAN, etc.).

In some embodiments, BMS interface 132 and/or middleware 14 includes an application gateway configured to receive input from applications running on client devices. For example, BMS interface 132 and/or middleware 14 may include one or more wireless transceivers (e.g., a Wi-Fi transceiver, a Bluetooth transceiver, a NFC transceiver, a cellular transceiver, etc.) for communicating with client devices. BMS interface 132 may be configured to receive building management inputs from middleware 14 or directly from one or more BMS subsystems 20-26. BMS interface 132 and/or middleware 14 can include any number of software buffers, queues, listeners, filters, translators, or other communications-supporting services.

Still referring to FIG. 3, BMS controller 12 is shown to include a processing circuit 134 including a processor 136 and memory 138. Processor 136 may be a general purpose or specific purpose processor, an application specific integrated circuit (ASIC), one or more field programmable gate arrays (FPGAs), a group of processing components, or other suitable processing components. Processor 136 is configured to execute computer code or instructions stored in memory 138 or received from other computer readable media (e.g., CDROM, network storage, a remote server, etc.).

Memory 138 may include one or more devices (e.g., memory units, memory devices, storage devices, etc.) for storing data and/or computer code for completing and/or facilitating the various processes described in the present disclosure. Memory 138 may include random access memory (RAM), read-only memory (ROM), hard drive storage, temporary storage, non-volatile memory, flash memory, optical memory, or any other suitable memory for storing software objects and/or computer instructions. Memory 138 may include database components, object code components, script components, or any other type of information structure for supporting the various activities and information structures described in the present disclosure. Memory 138 may be communicably connected to processor 136 via processing circuit 134 and may include computer code for executing (e.g., by processor 136) one or more processes described herein. When processor 136 executes instructions stored in memory 138 for completing the various activities described herein, processor 136 generally configures BMS controller 12 (and more particularly processing circuit 134) to complete such activities.

Still referring to FIG. 3, memory 138 is shown to include building objects 142. In some embodiments, BMS controller 12 uses building objects 142 to group otherwise ungrouped or unassociated devices so that the group may be addressed or handled by applications together and in a consistent manner (e.g., a single user interface for controlling all of the BMS devices that affect a particular building zone or room). Building objects can apply to spaces of any granularity. For example, a building object can represent an entire building, a floor of a building, or individual rooms on each floor. In some embodiments, BMS controller 12 creates and/or stores a building object in memory 138 for each zone or room of building 10. Building objects 142 can be accessed by UI clients 16 and remote applications 18 to provide a comprehensive user interface for controlling and/or viewing information for a particular building zone. Building objects 142 may be created by building object creation module 152 and associated with equipment objects by object relationship module 158, described in greater detail below.

Still referring to FIG. 3, memory 138 is shown to include equipment definitions 140. Equipment definitions 140 stores the equipment definitions for various types of building equipment. Each equipment definition may apply to building equipment of a different type. For example, equipment definitions 140 may include different equipment definitions for variable air volume modular assemblies (VMAs), fan coil units, air handling units (AHUs), lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types data measured or used by the VMA. Equipment definitions 140 allow for the abstraction (e.g., generalization, normalization, broadening, etc.) of equipment data from a specific BMS device so that the equipment data can be applied to a room or space.

Each of equipment definitions 140 may include one or more point definitions. Each point definition may define a data point of a particular type and may include search criteria for automatically discovering and/or identifying data points that satisfy the point definition. An equipment definition can be applied to multiple pieces of building equipment of the same general type (e.g., multiple different VMA controllers). When an equipment definition is applied to a BMS device, the search criteria specified by the point definitions can be used to automatically identify data points provided by the BMS device that satisfy each point definition.

In some embodiments, equipment definitions 140 define data point types as generalized types of data without regard to the model, manufacturer, vendor, or other differences between building equipment of the same general type. The generalized data points defined by equipment definitions 140 allows each equipment definition to be referenced by or applied to multiple different variants of the same type of building equipment.

In some embodiments, equipment definitions 140 facilitate the presentation of data points in a consistent and user-friendly manner. For example, each equipment definition may define one or more data points that are displayed via a user interface. The displayed data points may be a subset of the data points defined by the equipment definition.

In some embodiments, equipment definitions 140 specify a system type (e.g., HVAC, lighting, security, fire, etc.), a system sub-type (e.g., terminal units, air handlers, central plants), and/or data category (e.g., critical, diagnostic, operational) associated with the building equipment defined by each equipment definition. Specifying such attributes of building equipment at the equipment definition level allows the attributes to be applied to the building equipment along with the equipment definition when the building equipment is initially defined. Building equipment can be filtered by various attributes provided in the equipment definition to facilitate the reporting and management of equipment data from multiple building systems.

Equipment definitions 140 can be automatically created by abstracting the data points provided by archetypal controllers (e.g., typical or representative controllers) for various types of building equipment. In some embodiments, equipment definitions 140 are created by equipment definition module 154, described in greater detail below.

Still referring to FIG. 3, memory 138 is shown to include equipment objects 144. Equipment objects 144 may be software objects that define a mapping between a data point type (e.g., supply air temperature, room temperature, damper position) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that can be displayed via a user interface.

Equipment objects 144 can be created (e.g., by equipment object creation module 156) by referencing equipment definitions 140. For example, an equipment object can be created by applying an equipment definition to the data points provided by a BMS device. The search criteria included in an equipment definition can be used to identify data points of the building equipment that satisfy the point definitions. A data point that satisfies a point definition can be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships can be established between equipment objects to link equipment objects to each other. For example, a causal relationship can be established between a VMA and an AHU which provides airflow to the VMA. Causal relationships can also be established between equipment objects 144 and building objects 142. For example, equipment objects 144 can be associated with building objects 142 representing particular rooms or zones to indicate that the equipment object serves that room or zone. Relationships between objects are described in greater detail below with reference to object relationship module 158.

Still referring to FIG. 3, memory 138 is shown to include client services 146 and application services 148. Client services 146 may be configured to facilitate interaction and/or communication between BMS controller 12 and various internal or external clients or applications. For example, client services 146 may include web services or application programming interfaces available for communication by UI clients 16 and remote applications 18 (e.g., applications running on a mobile device, energy monitoring applications, applications allowing a user to monitor the performance of the BMS, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some embodiments, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a graphical user interface that consumes data points and/or display data defined by equipment definitions 140 and mapped by equipment objects 144.

Still referring to FIG. 3, memory 138 is shown to include a building object creation module 152. Building object creation module 152 may be configured to create the building objects stored in building objects 142. Building object creation module 152 may create a software building object for various spaces within building 10. Building object creation module 152 can create a building object for a space of any size or granularity. For example, building object creation module 152 can create a building object representing an entire building, a floor of a building, or individual rooms on each floor. In some embodiments, building object creation module 152 creates and/or stores a building object in memory 138 for each zone or room of building 10.

The building objects created by building object creation module 152 can be accessed by UI clients 16 and remote applications 18 to provide a comprehensive user interface for controlling and/or viewing information for a particular building zone. Building objects 142 can group otherwise ungrouped or unassociated devices so that the group may be addressed or handled by applications together and in a consistent manner (e.g., a single user interface for controlling all of the BMS devices that affect a particular building zone or room). In some embodiments, building object creation module 152 uses the systems and methods described in U.S. patent application Ser. No. 12/887,390, filed Sep. 21, 2010, for creating software defined building objects.

In some embodiments, building object creation module 152 provides a user interface for guiding a user through a process of creating building objects. For example, building object creation module 152 may provide a user interface to client devices (e.g., via client services 146) that allows a new space to be defined. In some embodiments, building object creation module 152 defines spaces hierarchically. For example, the user interface for creating building objects may prompt a user to create a space for a building, for floors within the building, and/or for rooms or zones within each floor.

In some embodiments, building object creation module 152 creates building objects automatically or semi-automatically. For example, building object creation module 152 may automatically define and create building objects using data imported from another data source (e.g., user view folders, a table, a spreadsheet, etc.). In some embodiments, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, memory 138 is shown to include an equipment definition module 154. Equipment definition module 154 may be configured to create equipment definitions for various types of building equipment and to store the equipment definitions in equipment definitions 140. In some embodiments, equipment definition module 154 creates equipment definitions by abstracting the data points provided by archetypal controllers (e.g., typical or representative controllers) for various types of building equipment. For example, equipment definition module 154 may receive a user selection of an archetypal controller via a user interface. The archetypal controller may be specified as a user input or selected automatically by equipment definition module 154. In some embodiments, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated an equipment-specific data point such as "VMA-20.DPR-POS" (i.e., the damper position of VMA-20) and/or "VMA-20.SUP-FLOW" (i.e., the supply air flow rate through VMA-20). Equipment definition module 154 abstract the equipment-specific data points to generate abstracted data point types that are generally applicable to other equipment of the same type. For example, equipment definition module 154 may abstract the equipment-specific data point "VMA-20.DPR-POS" to generate the abstracted data point type "DPR-POS" and may abstract the equipment-specific data point "VMA-20.SUP-FLOW" to generate the abstracted data point type "SUP-FLOW." Advantageously, the abstracted data point types generated by equipment definition module 154 can be applied to multiple different variants of the same type of building equipment (e.g., VMAs from different manufacturers, VMAs having different models or output data formats, etc.).

In some embodiments, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some embodiments, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some embodiments, search criteria include a text string abstracted from a data point associated with the archetypal controller. For example, equipment definition module 154 may generate the abstracted text string "SUP-FLOW" from the equipment-specific data point "VMA-20.SUP-FLOW." Advantageously, the abstracted text string matches other equipment-specific data points corresponding to the supply air flow rates of other BMS devices (e.g., "VMA-18.SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some embodiments, the equipment definition created by equipment definition module 154 includes an indication of display data for BMS devices that reference the equipment definition. Display data may define one or more data points of the BMS device that will be displayed via a user interface. In some embodiments, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some embodiments, equipment definition module 154 provides a visualization of the equipment definition via a graphical user interface. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition can be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., memory 138, equipment definitions 140, an external or remote data storage device, etc.).

Still referring to FIG. 3, memory 138 is shown to include an equipment object creation module 156. Equipment object creation module 156 may be configured to create equipment objects for various BMS devices. In some embodiments, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some embodiments, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other embodiments, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various embodiments, the BMS device used to generate the equipment object may be selected automatically (e.g., by equipment object creation module 156), manually (e.g., by a user) or semi-automatically (e.g., by a user in response to an automated prompt from equipment object creation module 156).

In some embodiments, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some embodiments, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some embodiments, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18.SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

Advantageously, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 can be viewed (e.g., via a user interface) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, memory 138 is shown to include an object relationship module 158. Object relationship module 158 may be configured to establish relationships between equipment objects 144. In some embodiments, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some embodiments, object relationship module 158 provides a user interface through which a user can define relationships between equipment objects 144 and building objects 142. For example, a user can assign relationships in a "drag and drop" fashion by dragging and dropping a building object and/or an equipment object into a "serving" cell of an equipment object provided via the user interface to indicate that the BMS device represented by the equipment object serves a particular space or BMS device.

Still referring to FIG. 3, memory 138 is shown to include a building control services module 160. Building control services module 160 may be configured to automatically control BMS 11 and the various subsystems thereof. Building control services module 160 may utilize closed loop control, feedback control, PI control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, air handling units, chillers, boilers, fans, pumps, etc.) in order to affect a variable state or condition within building 10 (e.g., zone temperature, humidity, air flow rate, etc.).

In some embodiments, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some embodiments, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some embodiments, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., east-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some embodiments, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
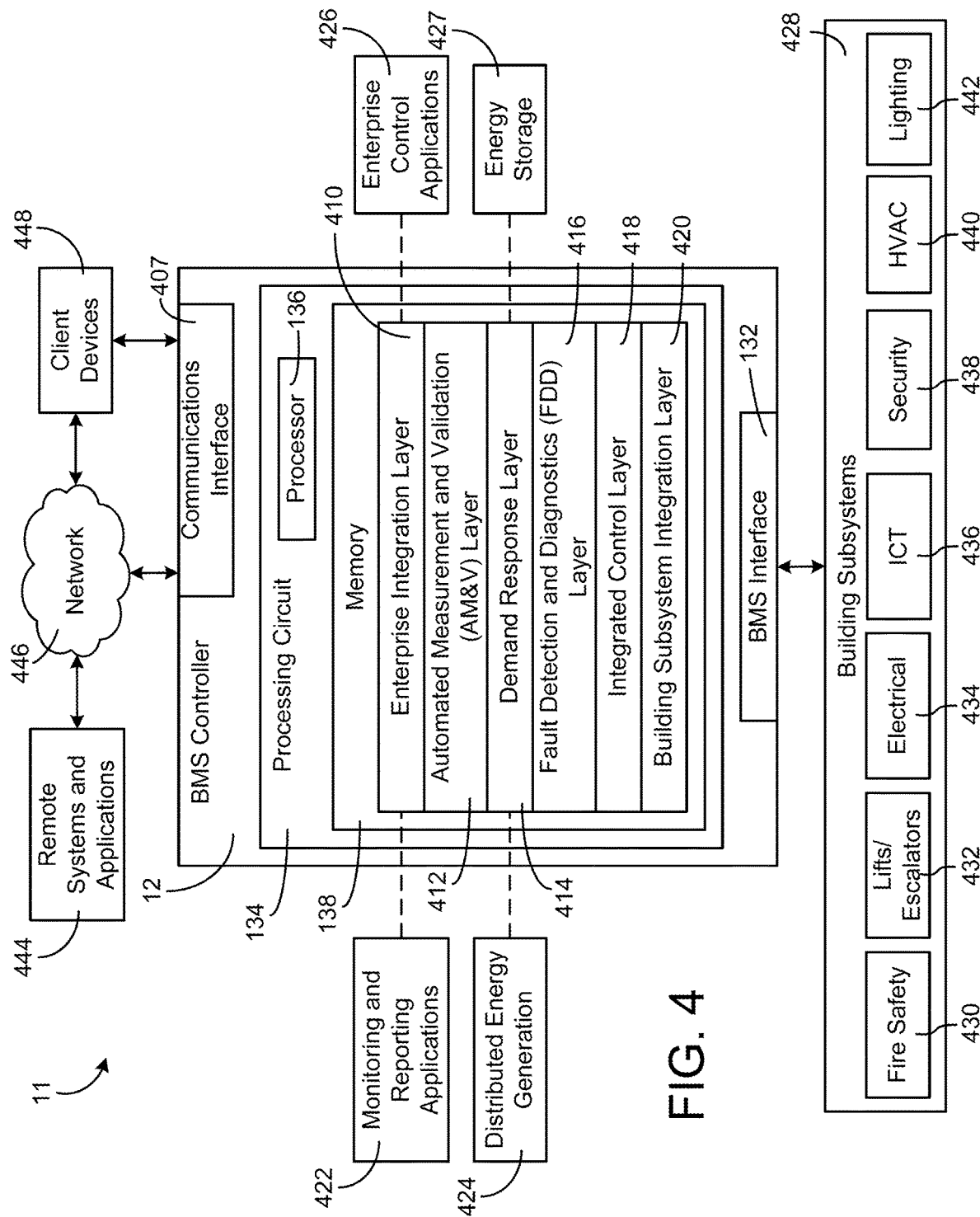
FIG. 4 is another block diagram of the BMS that serves the building of FIG. 1, according to some embodiments.

Referring now to FIG. 4, another block diagram illustrating a portion of BMS 11 in greater detail is shown, according to some embodiments. BMS 11 can be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 can include any number of devices, controllers, and connections for completing its individual functions and control activities. HVAC subsystem 440 can include many of the same components as HVAC system 20, as described with reference to FIGS. 2-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 132 can be direct (e.g., local wired or wireless communications) or via a communications network 446 (e.g., a WAN, the Internet, a cellular network, etc.). For example, interfaces 407, 132 can include an Ethernet card and port for sending and receiving data via an Ethernet-based communications link or network. In another example, interfaces 407, 132 can include a Wi-Fi transceiver for communicating via a wireless communications network. In another example, one or both of interfaces 407, 132 can include cellular or mobile phone communications transceivers. In one embodiment, communications interface 407 is a power line communications interface and BMS interface 132 is an Ethernet interface. In other embodiments, both communications interface 407 and BMS interface 132 are Ethernet interfaces or are the same Ethernet interface.

Still referring to FIG. 4, BMS controller 12 is shown to include a processing circuit 134 including a processor 136 and memory 138. Processing circuit 134 can be communicably connected to BMS interface 132 and/or communications interface 407 such that processing circuit 134 and the various components thereof can send and receive data via interfaces 407, 132. Processor 136 can be implemented as a general purpose processor, an application specific integrated circuit (ASIC), one or more field programmable gate arrays (FPGAs), a group of processing components, or other suitable electronic processing components.

Memory 138 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 138 can be or include volatile memory or non-volatile memory. Memory 138 can include database components, object code components, script components, or any other type of information structure for supporting the various activities and information structures described in the present application. According to some embodiments, memory 138 is communicably connected to processor 136 via processing circuit 134 and includes computer code for executing (e.g., by processing circuit 134 and/or processor 136) one or more processes described herein.

In some embodiments, BMS controller 12 is implemented within a single computer (e.g., one server, one housing, etc.). In various other embodiments BMS controller 12 can be distributed across multiple servers or computers (e.g., that can exist in distributed locations). Further, while FIG. 4 shows applications 422 and 426 as existing outside of BMS controller 12, in some embodiments, applications 422 and 426 can be hosted within BMS controller 12 (e.g., within memory 138).

Still referring to FIG. 4, memory 138 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 11.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 12. In yet other embodiments, enterprise control applications 426 can work with layers 410-420 to optimize building performance (e.g., efficiency, energy use, comfort, or safety) based on inputs received at interface 407 and/or BMS interface 132.

Building subsystem integration layer 420 can be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated super-system. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 can include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

A Field Controller for a Building Management System

Figure 5:
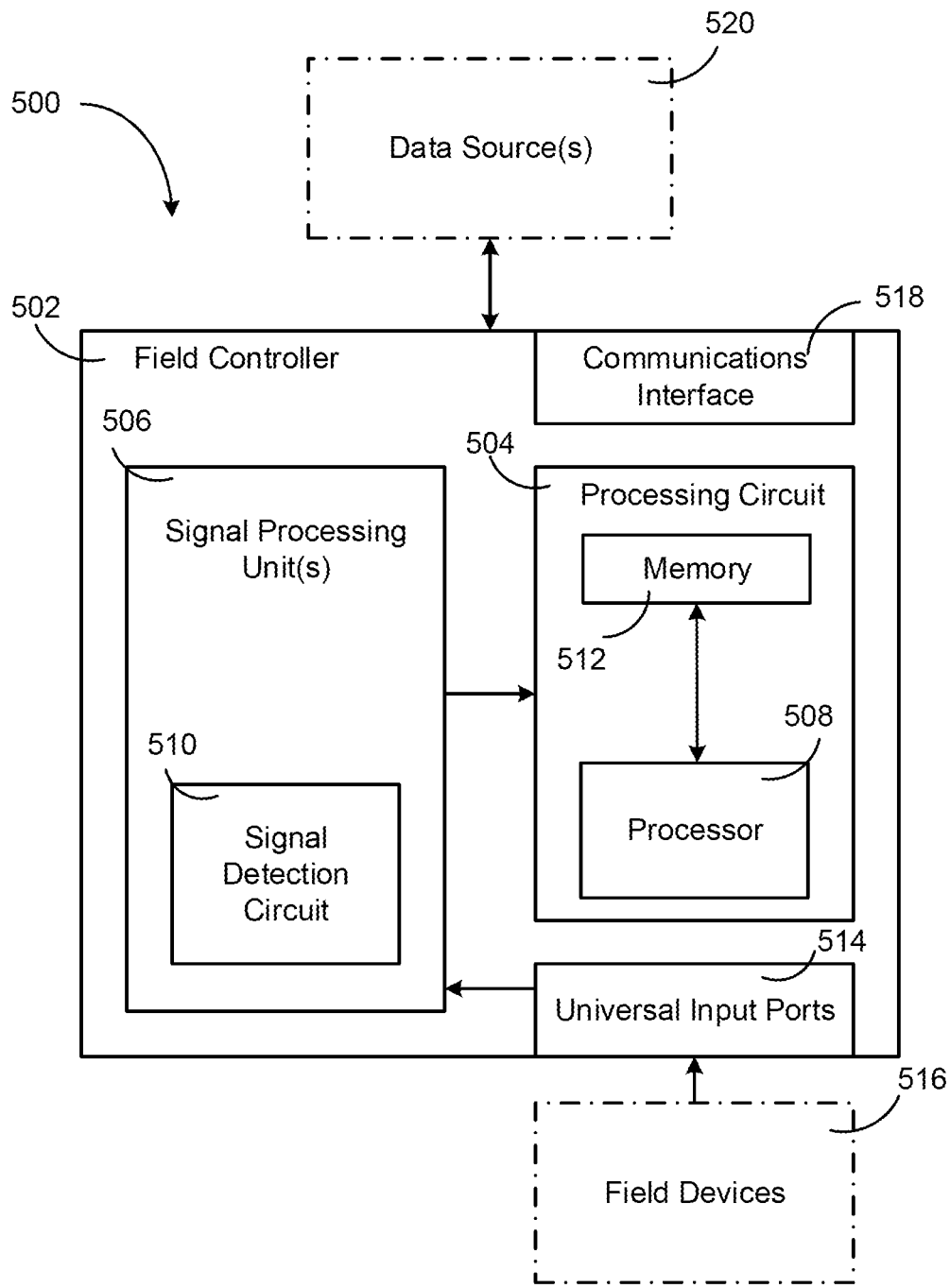
FIG. 5 is a block diagram of a field controller for the BMS, according to some embodiments.
Figure 6:
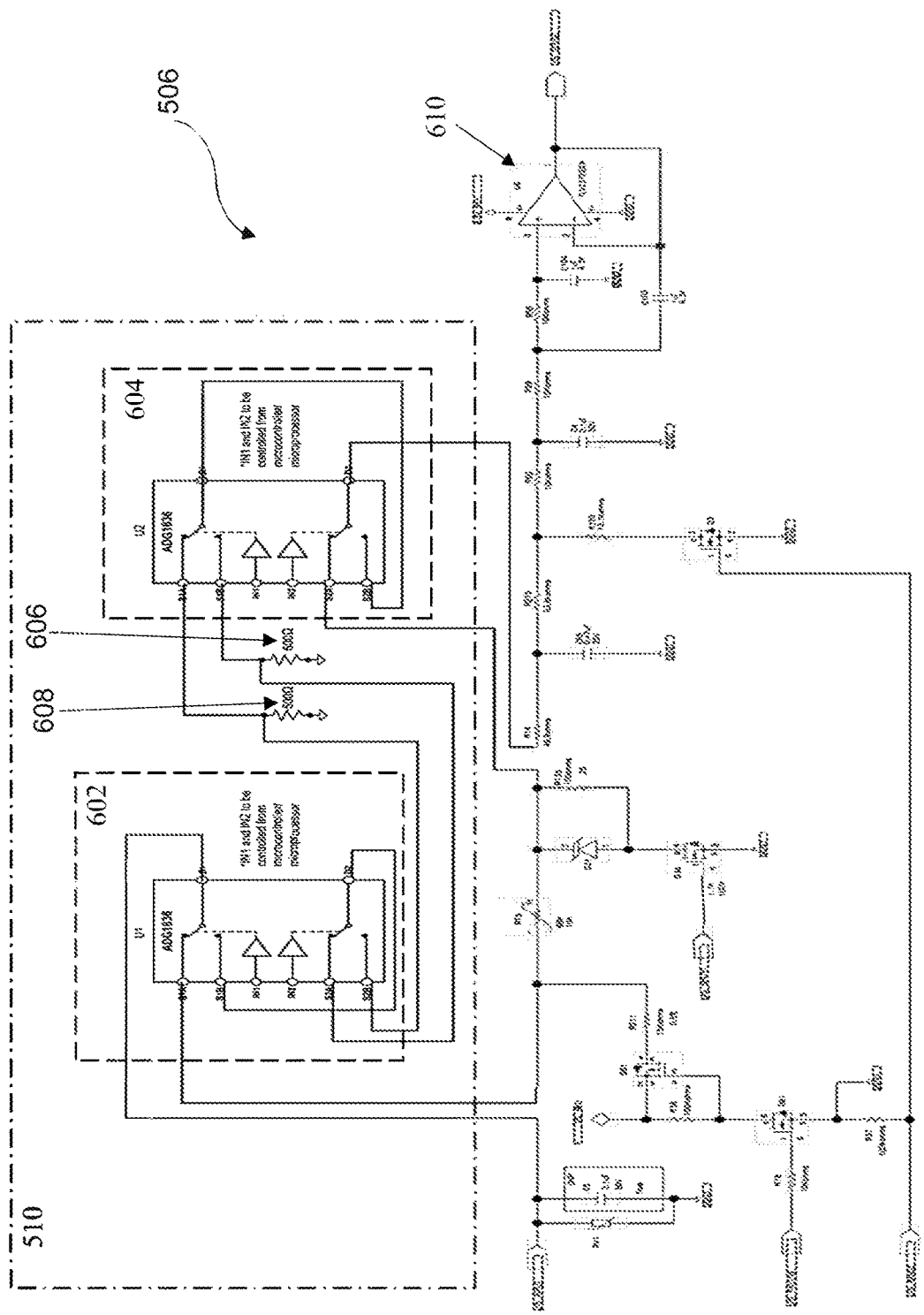
FIG. 6 is circuit diagram of a signal processing unit of the field controller of FIG. 5, according to some embodiments.

Referring now to FIGS. 5 and 6, a field controller 502 for a BMS is disclosed. In some embodiments, the BMS referred to may be the BMS of FIG. 2 or 4. In some embodiments, the BMS may be referred to as a building automation system (BAS).

The field controller 502 (also referred to as "controller 502") comprises a plurality of universal input (UI) port 514. The plurality of UI ports 514 enables a plurality of field devices 516 to connect with field controller 502. In some embodiments, the plurality of field devices 516 are connected to the UI ports 514 in one-to-one communication. In some embodiments, the plurality of field devices 516 can be selected from, but not limited to, temperature sensors, pressure sensors, flow rate sensors, humidity sensors, position sensors, cameras, radio frequency sensors, user input devices, and/or other data input devices. For example, one of the plurality of field devices 516 may be a position sensor that is associated with a damper to sense the position of the damper.

In some embodiments, the plurality of field devices 516 are configured to generate field signals. Field signals are provided to the UI ports 514 the field controller 502. The field controller 502 is provided with a control logic with details pertaining to a type of field signal for each of the polarity of UI ports 514. In some embodiments the control logic is defined any controller application file (CAF). The type of field signal can be one of the current-type field signal or voltage-type field signal. In some embodiments, the voltage-type field signal is the field signal in which the sensed data is represented by the voltage. In some embodiments, the current-type field signal is the field signal in which the sensed data is represented by the current.

The field controller 502 may be enabled to determine the sensed data from the field signal received at each of the plurality of UI ports 514 based on the type of field signal as defined in the control logic for each of the plurality of UI ports 514. For example, the field controller 502 may determine the sensed data by analyzing the voltage of the field signal when the UI port 514 the field signal is received at is tagged as a voltage-type in the control logic. If the field signal at voltage-type tagged UI port 514 is actually a current-type field signal, the field controller 502 may be not be configured to properly read the sensed data. To remedy this problem, field controller 502 of the present controller may be configured to automatically determine the type of field signal received at each of the plurality of UI ports 514, and to update the control logic accordingly.

Referring still to FIG. 5, in some embodiments the field controller 502 includes a communications interface 518, a processing circuit 504, a plurality of signal processing units 506, as well as the aforementioned plurality of UI ports 514. Although the present disclosure describes the communications interface 518, the plurality of signal processing units 506, and the processing circuit 504 as separate entities, in some embodiments each of the above may be integrated into a single processing circuit.

In some embodiments, field controller 502 is enabled to establish a communication link with one or more data sources 520 via the communications interface 518. The one or more data sources 520 can be selected from, but not limited to, a server, a user interface, a remote server, a cloud based server, a compact disk, an external storage device, a database, a floppy disk, a diskette, a computer, a portable storagedevice, a remote controller, and/or a virtual server. In some embodiments, the field controller 502 is configured to establish the communication link with the one or more data sources 520 to receive and store the CAF containing the control logic. The CAF is a resource file that resides in the field controller 502 and contains all logic components required to represent the field control system that is monitored and controlled by the field controller 502.

The communication link established with the one or more data source 520 may be either wired or wireless depending on the capabilities of the one or more data source 520. For example, communication interface 518 can establish a plug-and-play type connection with the one or more data source 520. In some embodiments, the processing circuit 504 can be implemented using one or more microcontrollers. In some embodiments, the processing circuit 504 is implemented using one or more processor(s), shown as processor 508. The processor 508 may be a general purpose or specific purpose processor, an application specific integrated circuit (ASIC), one or more field programmable gate arrays (FPGAs), a group of processing components, or other suitable processing components. The processor 508 is configured to execute computer code or instructions stored in a memory 512 or received from other computer readable media (e.g., CDROM, network storage, a remote server, etc.).

The memory 512 may include one or more devices (e.g., memory units, memory devices, storage devices, etc.) for storing data and/or computer code for completing and/or facilitating the various processes described in the present disclosure. The memory 512 may include random access memory (RAM), read-only memory (ROM), hard drive storage, temporary storage, non-volatile memory, flash memory, optical memory, or any other suitable memory for storing software objects and/or computer instructions. The memory 512 may include database components, object code components, script components, or any other type of information structure for supporting the various activities and information structures described in the present disclosure. The memory 512 may be communicably connected to the processor 508 via processing circuit 504 and may include computer code for executing (e.g., by the processor 508) one or more processes described herein. When the processor 508 executes instructions stored in the memory 512 for completing the various activities described herein, the processor 508 generally configures the processing circuit 504 and its modules/unit to complete such activities.

In some embodiments, the memory 512 is enabled to store the CAF comprising the control logic. In some embodiments, the field controller 502 receives the CAF from the one or more data sources 520 only once at the time of initialization. In some embodiments, the field signal is provided to the signal processing unit 506 via the UI port 514. The signal processing unit 506 may comprise a signal detection circuit 510 that is configured to receive the field signal and determine voltages across a first resistor 606 and a second resistor 608 (shown in FIG. 6). Further, the voltages across the first resistor 606 and the second resistor 608 may be provided to the processing circuit 504 to compare the voltages and determine the type of field signal (i.e., voltage-type or current-type). When the difference between the voltages across the resistors is approximately zero the signal may be classified as a voltage-type field signal. Further, when the difference between the voltages is approximately non-zero, the field signal may be classified as a current-type field signal. For example, the field signal may be classified as a current-type field signal when the differences between both the voltages is greater than or equal to 300 mV.

In some embodiments, processing circuit 504 may update the control logic by tagging the UI port 514 associated with the field signal according to the type of the field signal, enabling the field controller 502 to determine the sensed data. In some embodiments, the signal processing unit 506 is configured to perform signal conditioning. Signal conditioning may involve manipulation of the field signal to prepare it for the next stage of processing.

Referring now to FIG. 6, a circuit diagram for signal detection circuit 510 is shown, according to some embodiments. Signal detection circuit 510 may include a first switch 602, a second switch 604, a first resistor 606, and a second resistor 608. First switch 602 and second switch 604 may be analog switches. For example, each of the first switch 602 and the second switch 604 may be a ADG1636 switch, which is a monolithic CMOS device containing two independently-selectable single-pole/double-throw (SPDT) switches.

In some embodiments, the field signal is diverted via the signal detection circuit 510 when the field controller 502 is rebooted. When the field controller 502 is rebooted, the signal detection circuit 510 may thereafter be activated. Referring still to FIG. 6, when signal detection circuit 510 is activated a first input pin (IN1) of first switch 602 is pulled to LOW and a second input pin (IN2) of the first switch 602 is kept HIGH, while the first input pin (IN1) and the second input pin (IN2) of the second switch 604 are pulled to LOW. In this manner, first switch 602 and second switch 604, along with operational amplifier (OP-AMP) 610, generate a first output voltage that is proportional to the voltage drop across the first resistor 606.

In some embodiments, after the first output voltage is generated, the signal detection circuit generates the second output voltage. The IN2 of first switch 602 may be pulled to LOW while IN1 of first switch 602 is kept at LOW. IN1 of second switch 604 is pulled HIGH and the remaining input pin IN2 of second switch 604 is kept LOW. In this configuration, with OP-AMP 610, the second output voltage is generated that is proportional to the voltage drop across the second resistor 608.

As shown in FIG. 6, in some embodiments the resistance of the first resistor 606 is different than the resistance of the second resistor 608. For example the resistance of the first resistor 606 may be greater than the resistance of the second resistor 608. As shown in FIG. 6, the resistance of the first resistor 606 may be 600 Ohms and the resistance of the second resistor 608 may be 500 Ohms.

In some embodiments, the first input pins and the second input pins are controller by the processor 508 of the processing circuit 504. The processing circuit 504 is provided with the first input voltage and the second input voltage generated according to the process described above. The processor 508 is configured to compare the first output voltage and the second output voltage to determine the type of field signal received from the UI port 514. The processor 508 is then configured to update the control logic stored in memory 512 with the type of field signal being provided by field device 516 at the UI port 514. It should be understood that while only one field device 516 is shown, a plurality of field devices 516 may be connected to a plurality of UI ports 514.

In some embodiments, the signal detection circuit 510 of the signal processing unit 506 is partially bypassed during normal operation, i.e., the field signals are not directed through the first resistor 606 and the second resistor 608. The field signals may only be directed to the signal detection circuit when detection is needed, for example when a new device is added, a device is reconfigured, or the field controller 502 is rebooted. Instead, in normal operation, the flow-path of the field signal may be via the D1 pin and the S1A pin of first switch 602, resistor RTS, S2A pin and D2 pin of the second switch 604, followed by resistors R14, R215, R60, R59, and R58, before finally the field signal is provided to the processor 508 via the OP-AMP 610. In some embodiments, the field signal is an analog signal, and the field signal may be provided by the signal processing unit 506 to an analog input pin of a microcontroller when the processing circuit 508 is a microcontroller. Although the present disclosure describes the signal detection circuit 510 as part of signal processing unit 506, it is contemplated that the signal detection circuit 510 and the signal processing unit 506 can be separate entities.

In some embodiments, the signal processing unit 506 includes a comparator (not shown) that is configured to receive and compare the first output voltage and the second output voltage to determine the type of field signal received from the UI port 514, which can then be used to update the control logic.

Figure 7:
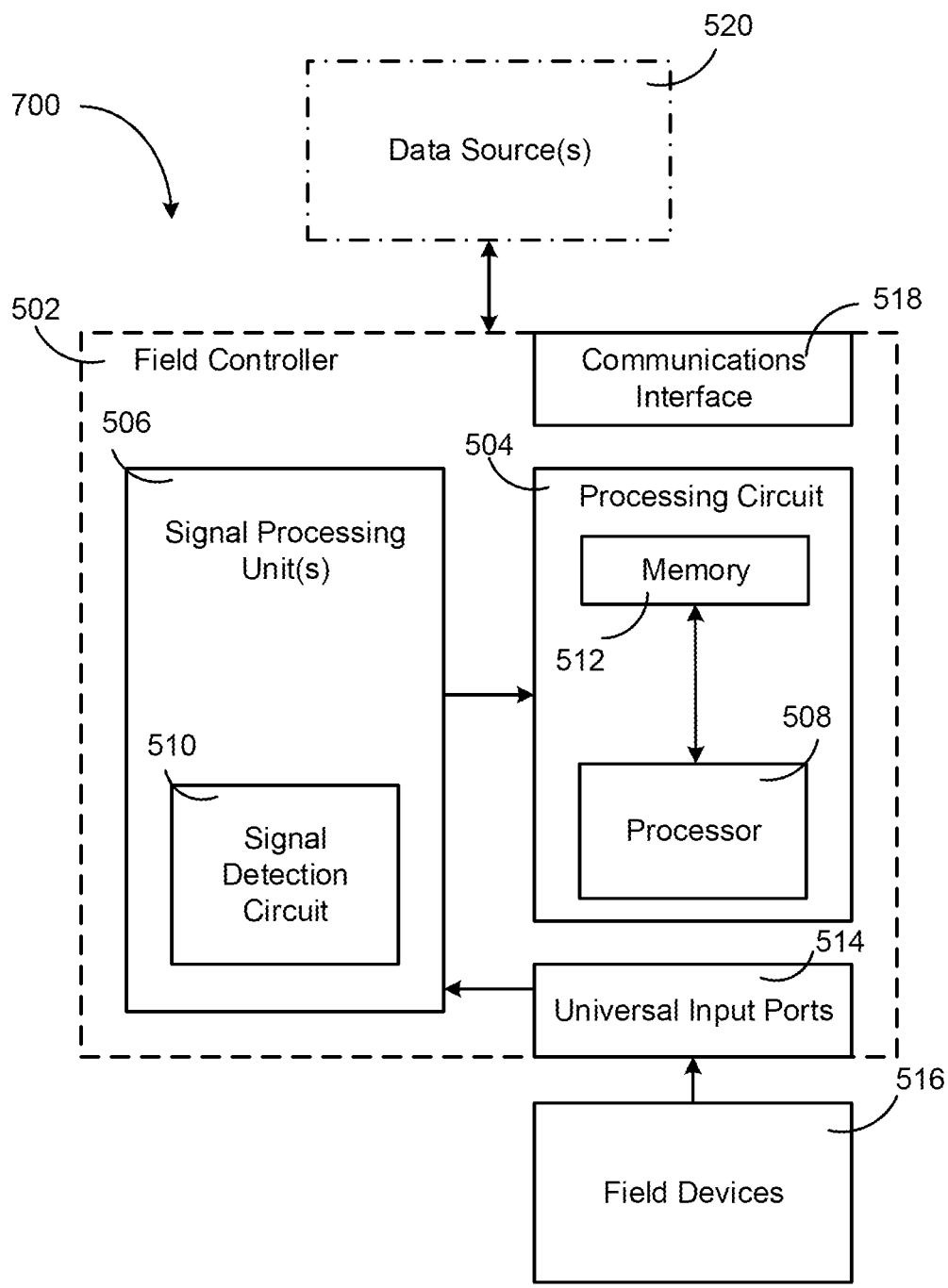
FIG. 7 is a block diagram of a system for determining the types of field signals in a BMS, according to some embodiments.

Referring now to FIG. 7, a block diagram of system 700 for determining the type of field signals is shown, according to some embodiments. FIG. 5 is similar to FIG. 7, and like numbers may be used for like items. System 700 may comprise one or more processing circuits 504, a plurality of signal processing units shown as signal processing unit 506, and a plurality of field devices shown as field device 516. In some embodiments, the processing circuit 504 and the signal processing unit 506 are a part of field controller 502. Field controller 502 may be configured to receive a plurality of field signals from the plurality of field devices 516 via a plurality of UI ports 514.

The plurality of signal processing units 506 may be connected to the plurality of UI ports 514 in one-to-one communication. The field signals received at the UI port 514 may be directed to an associated signal processing unit 506 that is configured to generate a first output voltage and a second output voltage. The first output voltage may be the voltage drop across a first resistor, such as first resistor 606 of FIG. 6, and the second output voltage may be a voltage drop across a second resistors, such as second resistor 608. Processing circuit 504 may receive and compare the first output voltage and the second output voltage to determine the type of field signal. Processing circuit 504 may then update the control logic accordingly to tag a given UI port 514 with its associated field signal type. As described above, the field signal may be determined to be a voltage-type field signal when the difference between the first output voltage and the second output voltage is zero (or near zero) and relatedly the field signal is determined to be a current-type field signal when the difference between the first output voltage and the second output voltage is non-zero (or near non-zero). For example, a field signal may be determined to be a current-type field signal when the difference between the first output voltage and the second output voltage is greater than or equal to 300 mV.

Figure 8:
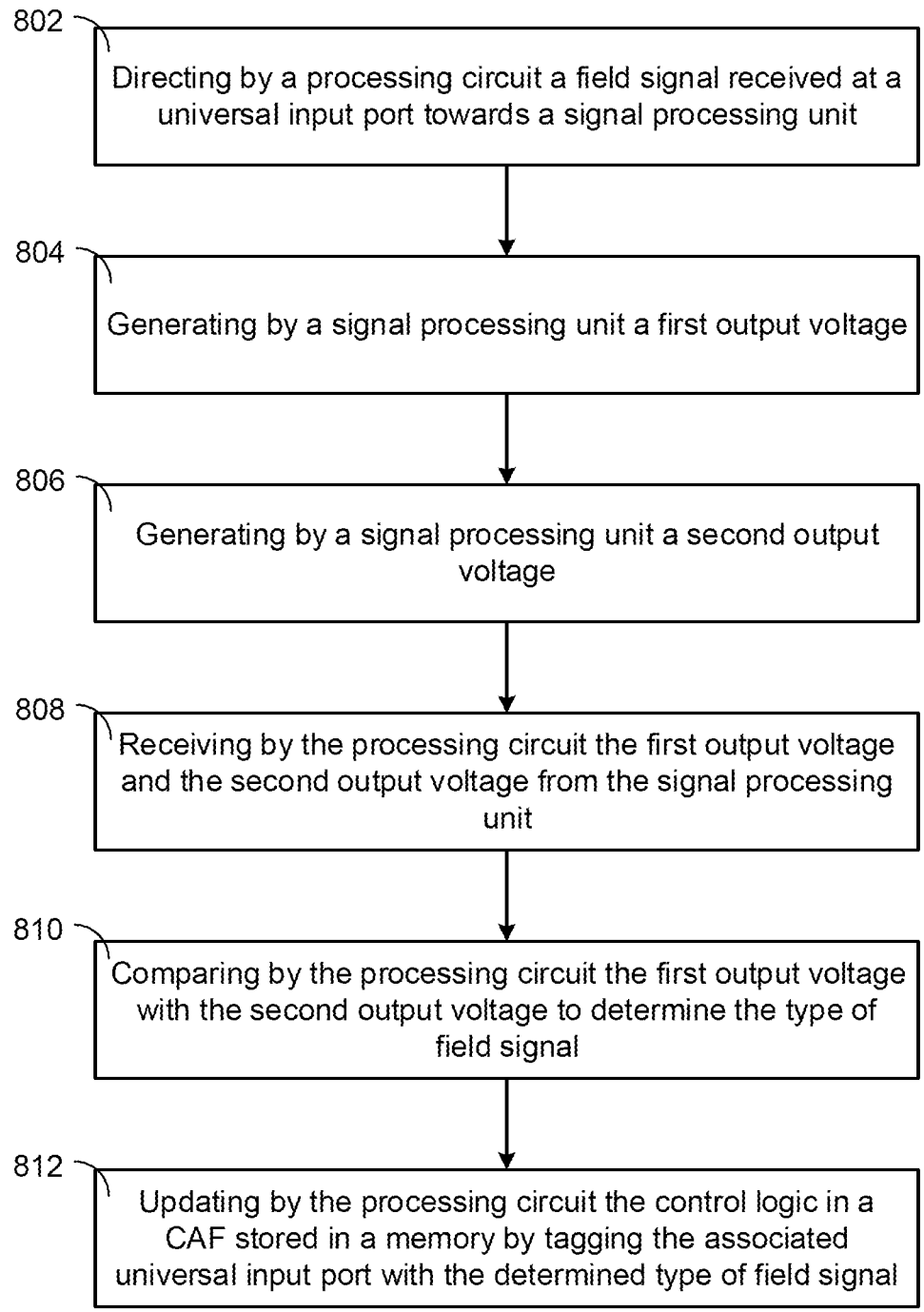
FIG. 8 is a flow chart of a process for determining a type of field signal in the BMS, according to some embodiments.

Method for Automatically Determining Types for Field Signals in a Building Management System Referring now to FIG. 8, a flow chart of a method for automatically determining the type of a field signal in a BMS is shown, according to some embodiments. The method shown in FIG. 8 may be performed by one or more devices in a BMS, for example field controller 502. In general, field devices such as field device 516 are configured to generate a field signal representing sensed data (i.e., a field input, such as a temperature, pressure, position, etc.). The sensed data may be represented by either a current or voltage of the field signal. A field controller such as field controller 502 may be configured to analyze the field signals received at the UI ports 514 according to each field signals type. For example, the field signal may be a voltage-type field signal wherein the sensed data corresponds to the voltage. The field signal may alternatively be a current-type field signal where the sensed data corresponds to the current.

As shown in FIG. 8, the method includes directing by a processing circuit a field signal received at a universal input port towards a signal processing unit at step 802. In some embodiments, the field signal is normally directed to a processing circuit, such as processing circuit 504, for reading the sensed data. In response to a field device being added or reconfigured, the field signal from said field device may be directed by the processing circuit to the signal processing unit for type detection, before it is returned to the processing circuit to read the sensed data according to the detected type. In some embodiments, the field signal is directed towards a signal detection circuit such as signal detection circuit 510 of signal processing circuit 506. The field signal may be directed as explained above in response to a change in the field device, but the field signal may also be directed to the signal processing circuit 506 when the field controller is rebooted.

Step 804 is shown to include generating by a signal processing circuit a first output voltage. As described above with reference to FIGS. 5-7, the first output voltage may be proportional to the voltage drop across a first resistor. In some embodiments, the first resistor is a 600 Ohms resistor. In some embodiments, in order to direct the field signal across the first resistor, referring back to FIG. 6, a first input pin (IN1) of a first switch 602 along with a first input pin (IN2) and a second input pin (IN2) of a second switch 604 are pulled to LOW while a second input pin (IN2) of the first switch 602 is kept at HIGH. Accordingly, an OP-AMP such as OP-AMP 610 may generate the first output voltage, wherein the output voltage is proportional to the voltage drop across the first resistor 606.

Step 806 is shown to include generating, by a signal processing circuit, a second output voltage. The second output voltage may be proportional to the voltage drop across a second resistor, such as across second resistor 608 of FIG. 6. As shown, the second resistor 608 may be a 500 Ohm resistor. In some embodiments, in order to direct the field signal across the first resistor, referring back to FIG. 6, the second input pin (IN2) of first switch 602 is pulled to logic low while the first input pin (IN1) of the first switch 602 is kept at LOW. Additionally, the first input pin (IN1) of the second switch 604 is pulled to HIGH, with the second input pin (IN2) of the second switch 604 is kept at LOW. In this configuration, an OP-AMP such as OP-AMP 610 generates the second output voltage, wherein the second output voltage is proportional to the voltage drop across the second resistor 608. Steps 804 and 806 may be performed by the signal processing circuit 506 shown in FIGS. 5 and 7.

Step 808 is shown to include receiving by the processing circuit the first output voltage and the second output voltage from the signal processing circuit. At step 810, the processing circuit is configured to compare the first output voltage and the second output voltage to determine the type of the field signal. As described above, the field signal may be determined to be a voltage-type field signal when the difference between the first output voltage and the second output voltage is zero (or near zero), and a current-type field signal when the difference between the first output voltage and the second output voltage is non-zero, or near non-zero. For example, a field signal may be determined to be a current-type field signal when the difference in voltage between the first output voltage and the second output voltage is greater than or equal to 300 mV. Conversely, the signal may be determined to be a voltage-type signal when the difference in voltage between the first output voltage and the second output voltage is less than 300 mV, or what this disclosure refers to as zero (i.e., near zero, approximately zero, etc.).

Step 812 includes updating, by the processing circuit, the control logic in a CAF stored in a memory by tagging the associated universal input port with the determined type of field signal. As explained above, tagging the UI port according to the determined signal type allows the field controller to read the sensed data contained in the signal. It should understood that the above steps may be performed for field signals received at each of the plurality of input ports 514, wherein a single discrete signal processing unit 506 is connected to each of the universal input ports 514.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for building equipment in a building management system, the controller comprising a processing circuit configured to:
   receive a field signal from the building equipment on an input port of the controller;
   determine a type of the field signal, including generate a first and second output voltage based on the field signal, wherein the first output voltage is proportional to a voltage drop across a first resistor of the controller, and the second output voltage is proportional to a voltage drop across a second resistor of the controller, wherein the first resistor and the second resistor are distinct from each other;
   compare the first output voltage and the second output voltage; and
   update a control logic comprising instructions for reading the field signal by tagging within the control logic the input port with the determined type of the field signal.

2. The controller of claim 1, wherein if the difference between the first output voltage and the second output voltage is near zero, the type of the field signal is voltage-type, and if the difference between the first output voltage and the second output voltage is near non-zero, the type is a current-type.

3. The controller of claim 1, wherein the resistance of the first resistor is greater than the resistance of the second resistor.

4. The controller of claim 3, wherein the resistance of the first resistor is 600 Ohms and the resistance of the second resistor is 500 Ohms.

5. The controller of claim 4, wherein if the difference between the first output voltage and the second output voltage is greater than or equal to 300 mV, the type is a current-type, and if the difference between the first output voltage and the second output voltage is less than 300 mV, the type is a voltage-type.

6. The controller of claim 1, wherein the first resistor and the second resistor are in parallel.

7. A method for updating a control logic for a controller in a building management system, the method comprising the steps of:
   receiving, through an input port of the controller, a field signal from a piece of building equipment;
   determining, by the controller, a type of the field signal, including generating, by the controller, a first and second output voltage based on the field signal, wherein the first output voltage is proportional to a voltage drop across a first resistor of the controller, and the second output voltage is proportional to a voltage drop across a second resistor of the controller, wherein the first resistor and the second resistor are distinct from each other; and
   updating, by the controller, the control logic by tagging the input port with the determined type of the field signal.

8. The method of claim 7, further comprising the steps of:
   reading, by the controller, sensed data from the field signal according to the type of the field signal tagged to the input port the field signal was received on by the control logic.

9. The method of claim 7, wherein determining, by the controller, a type of the field signal further comprises the steps of:
   comparing, by the controller, the first output voltage and the second output voltage, wherein the type of the field signal depends on the difference between the first output voltage and the second output voltage.

10. The method of claim 8, wherein the resistance of the first resistor is greater than the resistance of the second resistor.

11. The method of claim 8, wherein the resistance of the first resistor is 600 Ohms and the resistance of the second resistor is 500 Ohms.

12. The method of claim 11, wherein if the difference between the first output voltage and the second output voltage is greater than or equal to 300 mV, the type is a current-type, and if the difference between the first output voltage and the second output voltage is less than 300 mV, the type is a voltage-type.

13. The method of claim 9, wherein if the difference between the first output voltage and the second output voltage is near zero, the type of the field signal is a voltage-type, and if the difference between the first output voltage and the second output voltage is near non-zero, the type is a current-type.

14. The method of claim 7, wherein the first resistor and the second resistor are in parallel.

15. A system for updating control logic of a controller comprising:
   a signal processing unit configured to:
      receive a field signal from an input port of the controller; and
      generate a first and second output based on the field signal; and
   a processing circuit communicably coupled to the signal processing unit configured to;
      determine a type of the field signal by comparing a first output voltage and a second output voltage, wherein the first and second output voltages are a first output voltage corresponding to a voltage drop across a first resistor of the signal processing unit and a second output voltage corresponding to a voltage drop across a second resistor of the signal processing unit, wherein the first resistor and the second resistor are distinct from each other; and update a control logic comprising instructions for reading sensed data from the field signal by tagging the input port of the controller with the determined type of the field signal.

16. The system of claim 15, wherein the signal processing unit is further configured to read the sensed data from the field signal according to the type tagged to the input port the field signal was received on.

17. The system of claim 15, wherein the resistance of the first resistor is greater than the resistance of the second resistor.

18. The system of claim 15, wherein the type of the field signal is determined to be a current-type when the difference between the first output voltage and the second output voltage is near non-zero, and the type of the field signal is determined to be a voltage-type when the difference between the first output voltage and the second output voltage is near zero.

19. The system of claim 18, wherein the first resistor has a resistance of 100 ohms more than the second resistor.

20. The system of claim 15, wherein the first resistor and the second resistor are in parallel.

* * * * *